United States Patent [19]

Udelle

[11] Patent Number: 5,540,186
[45] Date of Patent: Jul. 30, 1996

[54] MECHANICALLY ASSISTED ANIMAL SELF GROOMING DEVICE

[76] Inventor: Steven D. Udelle, 26414 Barranquilla Ave., Punta Gorda, Fla. 33983

[21] Appl. No.: 348,728

[22] Filed: Dec. 2, 1994

[51] Int. Cl.$^6$ .................................................. A01K 13/00
[52] U.S. Cl. ............................................ 119/609; 119/706
[58] Field of Search ................................ 119/83, 85, 91, 119/157, 707, 711, 706

[56] References Cited

U.S. PATENT DOCUMENTS

| | | | |
|---|---|---|---|
| 2,441,058 | 5/1948 | Carwile | 119/83 |
| 2,721,538 | 10/1955 | Latham | 119/83 |
| 3,175,537 | 3/1965 | Paul | 119/91 |
| 3,599,606 | 8/1971 | Hayward | 119/83 |
| 3,665,892 | 5/1972 | Kusisto | 119/719 |
| 4,577,590 | 3/1986 | Skroch | 119/719 |
| 4,729,147 | 3/1988 | Armbruster | 15/314 |
| 4,872,422 | 10/1989 | Della Vecchia | 119/83 |
| 4,926,796 | 5/1990 | Leopold | 119/83 |
| 4,996,946 | 3/1991 | Olson | 119/706 |
| 5,207,183 | 5/1993 | Praschulk | 119/87 |
| 5,211,131 | 5/1993 | Plyler | 119/87 |

FOREIGN PATENT DOCUMENTS

| | | | |
|---|---|---|---|
| 2643220 | 8/1990 | France | 119/83 |
| 1540747 | 2/1990 | U.S.S.R. | 119/83 |

*Primary Examiner*—Todd E. Manahan

[57] ABSTRACT

A mechanically assisted animal self-grooming device simulates the brushing movements of a human hand by utilizing a compact, maintenance-free miniature electric motor assembly (22) affixed and concealed to the underside of upper surface (28) of housing assembly (10). The electric motor assembly output shaft (24) is directly coupled to an opening (30) in the bottom of the brush body (12). The brush body (12) is shaped to accommodate the top and side surface of an animal's body simultaneously. An electrically powered reversing switch (40) permits changing the rotation of the electric motor (48) when desired. An animal can effectively groom its coat by simply pressing any part of its body against the rotating brush.

6 Claims, 3 Drawing Sheets

MECHANICALLY ASSISTED ANIMAL SELF GROOMING DEVICE

FIELD OF THE INVENTION

The present invention relates to animal self grooming devices, and more particularly to a mechanically assisted animal self grooming device.

BACKGROUND-DISCUSSION OF THE PRIOR ART

While there are many mechanical grooming devices depicted in the prior art, all of these devices require human assistance to be useful. None of the prior art researched shows or teaches such a device that would mechanically assist an animal in its self grooming efforts. Examples of devices requiring human assistance are U.S. Pat. No. 5,207,183, 05/04/93, by Praschulk, U.S. Pat. No. 5,211,131, May 18, 1993, by Plyler, and U.S. Pat. No. 4,729,147, 03/08/88, by Armbruster.

SUMMARY OF THE INVENTION

The prior art also shows many stationary self grooming devices, wherein the animal has to provide all of the motions or efforts to utilize the devices as they were intended. Most animals will remain appreciative for extended periods of time, when brushes are moved against their bodies by the human hand.

The object of the present invention is to provide mechanical movement to an otherwise stationary brush, to simulate the brushing movements of the human hand.

Another object is to encourage the animal to spend more productive time with the moving brushing or rubbing medium of the device, for further removal of loose hair and debris from its body.

Another object is that the base floor has a plurality of recessed, slotted openings for loose hair, flea eggs, and dander associated with allergies, dropped from an animal's body to pass therethrough, whereby these unwanted pollutants can be contained within the device.

Still another object is that the rubbing medium, carpeted floor, and the debris retention rail serve to further contain the loose hair and debris within the device, thereby protecting the living environment from unnecessary animal hair.

Yet another object is that the present invention produces a synergistic effect.

BRIEF DESCRIPTION OF THE DRAWINGS

FIG. 2a shows a plan front view of a round, ball shaped rubbing medium as an alternate embodiment of FIG. 1a.

COMPLETE DESCRIPTION OF THE INVENTION

Figure 1B:
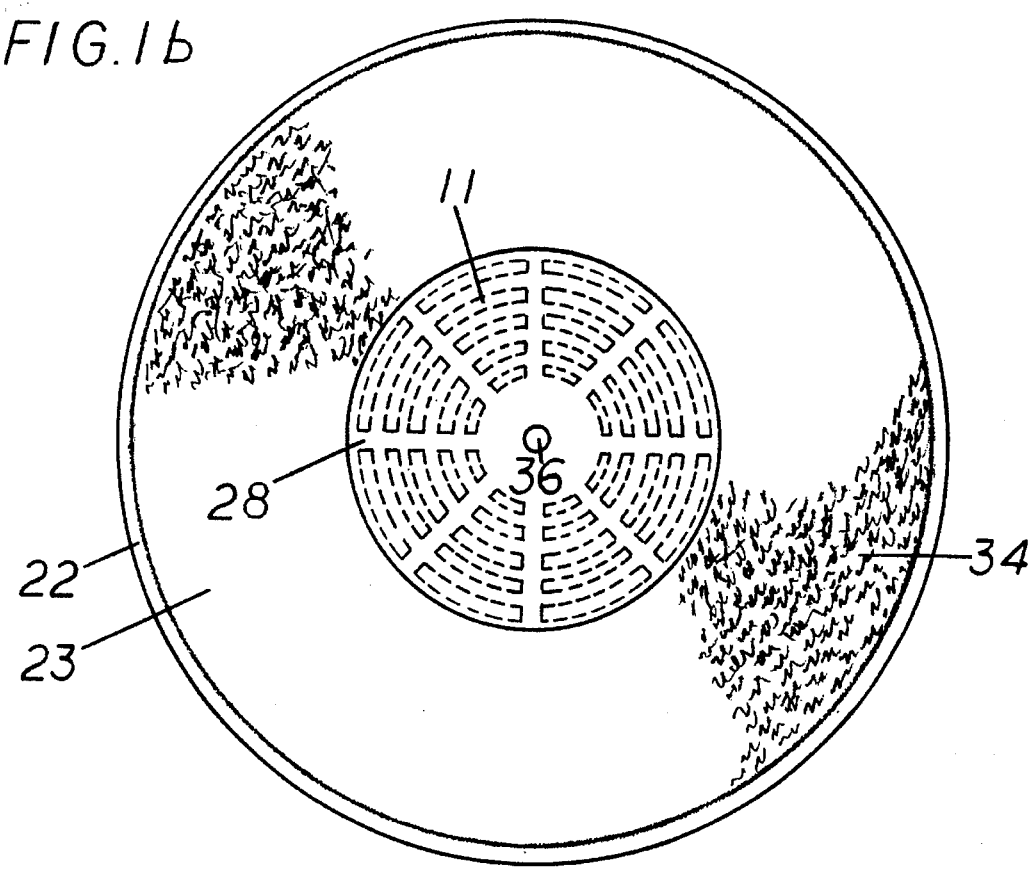
FIG. 1b shows a plan top view of FIG. 1a displaying the debris retention rail and the carpeted base floor.
Figure 1A:
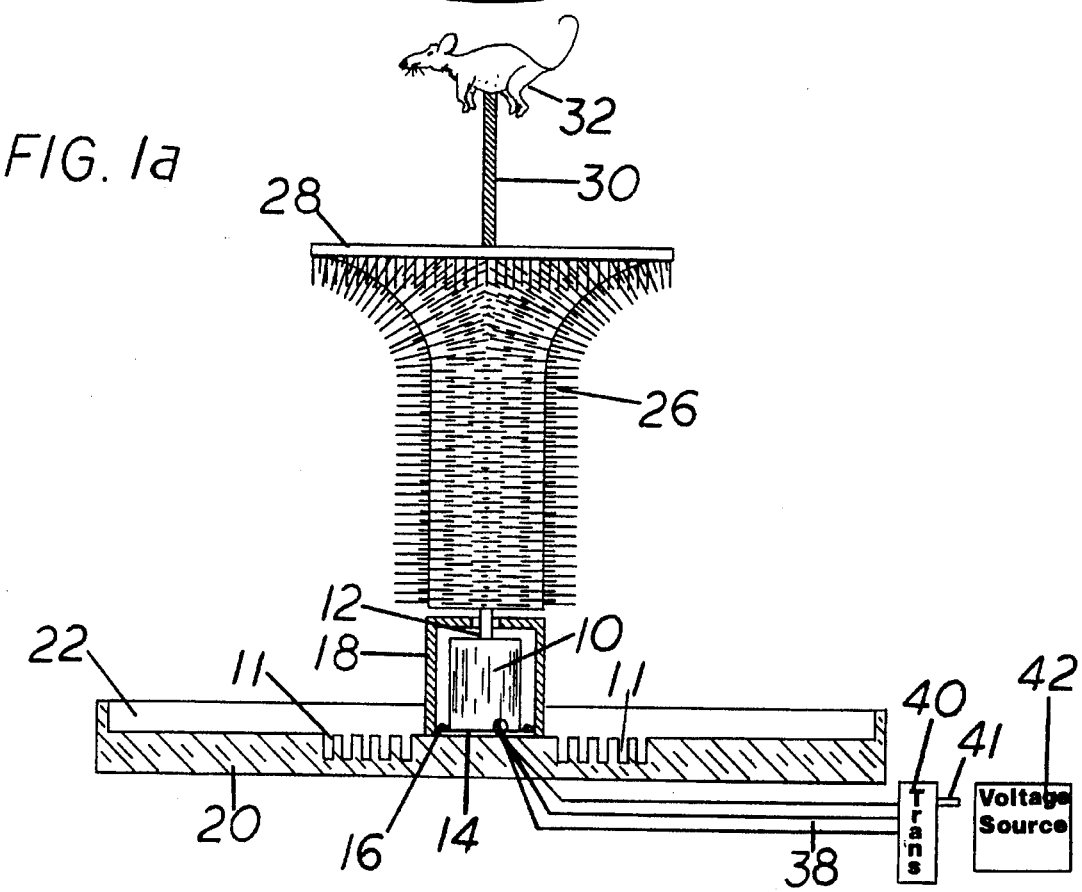
FIG. 1a shows a plan front view of the upper portion, and a cross sectional view of the base and motor enclosure of the preferred embodiment of the invention.

FIG. 1a is a preferred embodiment of the present invention showing a plan Front view of the upper portion and a view in cross section of the circular base 20, recessed slotted openings 11, and an enclosure 18, housing a motor 10. The perimeter of the circular base 20 has a debris retention rail 22, for animal debris containment within the device area. The motor 10 has an integral mounting plate 14, for fastening to the base 20, by a plurality of screws 16. The motor 10, is directly coupled (shown in detail in FIG. 1c) by its shaft 12, to a rubbing medium comprised of a plurality of bristles 26. The top portion of the rubbing medium 28 supports a straight, flexible spring 30, with a lure 32 mounted to its uppermost portion. A plurality of wires 38 extend from the motor 10 to a voltage reducing transformer 40/plug 41 combination that mates into an external power source 42. The device is powered by low voltage electricity, harmless to an animal upon chewing into the line cord. The transformer 40 voltage output turns the motor 10, with the coupled rubbing medium 26, at a movement of 10 to 15 revolutions per minute to simulate the brushing movement of a human hand. To encourage additional time and amusement at the rubbing medium 26, a lure 32 is mounted atop a straight, flexible spring 30, that is constantly moving in circles as an added attraction to an animal.

FIG. 1b is a plan top view of FIG. 1a showing the base floor 23, debris retention rail 22, carpeted floor 34, recessed, elongated, slotted openings 11 for the containment of loose hair, flea eggs, and dander dropped from an animal's body therethrough and the center portion 28, showing a straight, flexible, spring 30 of FIG. 1a.

Figure 1C:
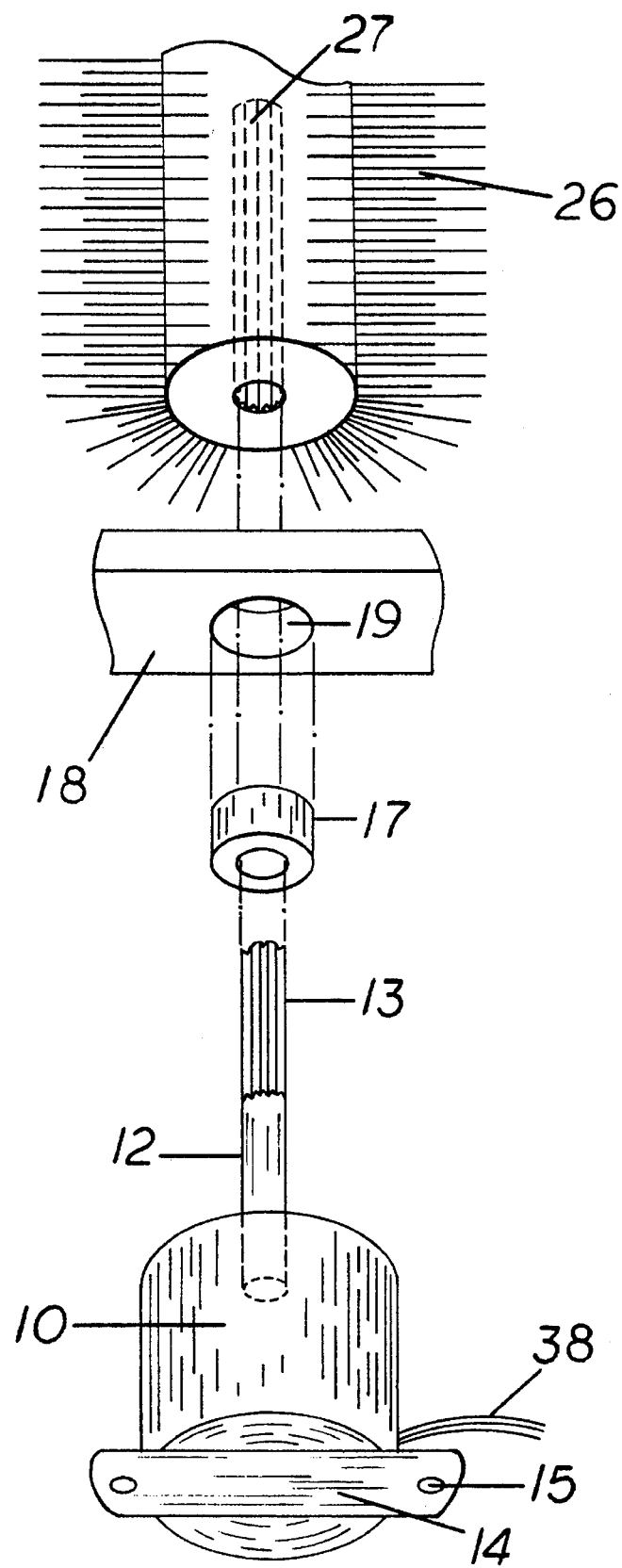
FIG. 1c shows an exploded view in perspective of the mechanical components of FIG. 1a with a cutaway view of the rubbing medium.

FIG. 1c shows an exploded view in perspective of FIG. 1a in further detail of the mechanical components and their connections to each other. The electric motor 10 has an integral mounting plate 14 attached to its bottom portion, and a plurality of holes 15 for fastening purposes. The top portion of the motor 10 has a round shaft portion 12 at its inner end, whereby the sleeve bearing 17, when passed down the motor shaft's inner portion 12 serves to hold the round shaft 12 vertical and rigid in respect to the fastened bottom of the motor 10. The sleeve bearing 17, is press fitted to the opening 19 of the cutaway segment of the top of motor enclosure 18 of FIG. 1a. The outer portion of the motor shaft is fluted or splined 13 to be inserted and coupled to the recessed opening 27 of the lowermost portion of rubbing medium 26 showing a partial covering of bristles for better clarity. The use of the spline 13 can couple many different shapes of brush heads by simply pulling them off of the splined shaft. The lateral pressure against the rubbing medium by an animal causes the spline 13 to bind, preventing the uplifting of the rubbing medium 26 from the splined motor shaft.

Figure 2A:
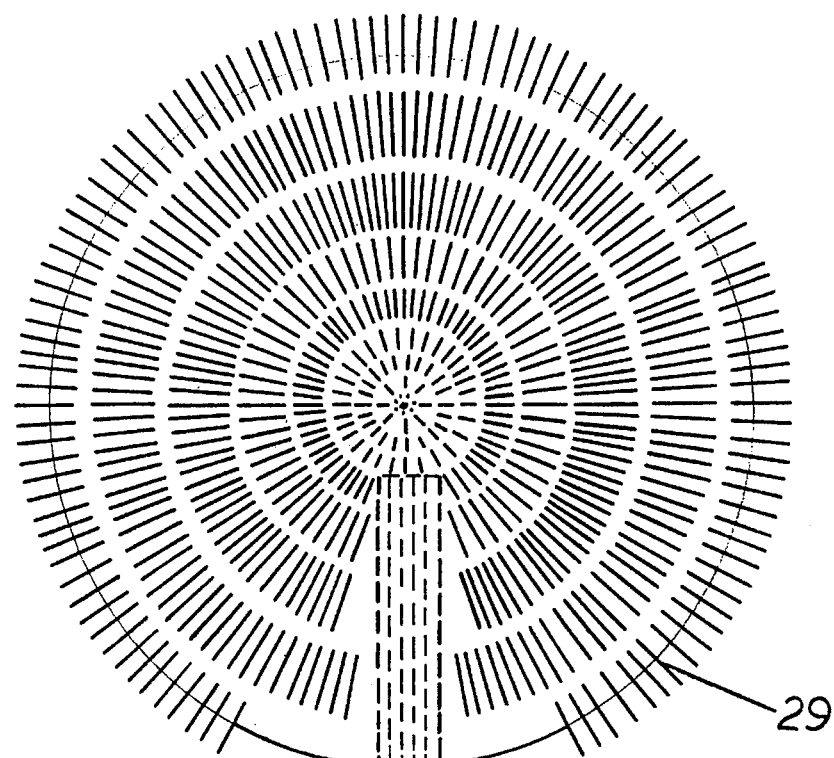

FIG. 2a is a plan front view of an alternate embodiment of FIG. 1a showing a rubbing medium 29, shaped like a round ball, partially covered with bristles for better clarity of the recessed, splined shaft opening 27. This particular shape of rubbing medium 29 permits the animal's underbody to have a thorough contact with the bristles for effective hair and debris removal.

Figure 2B:
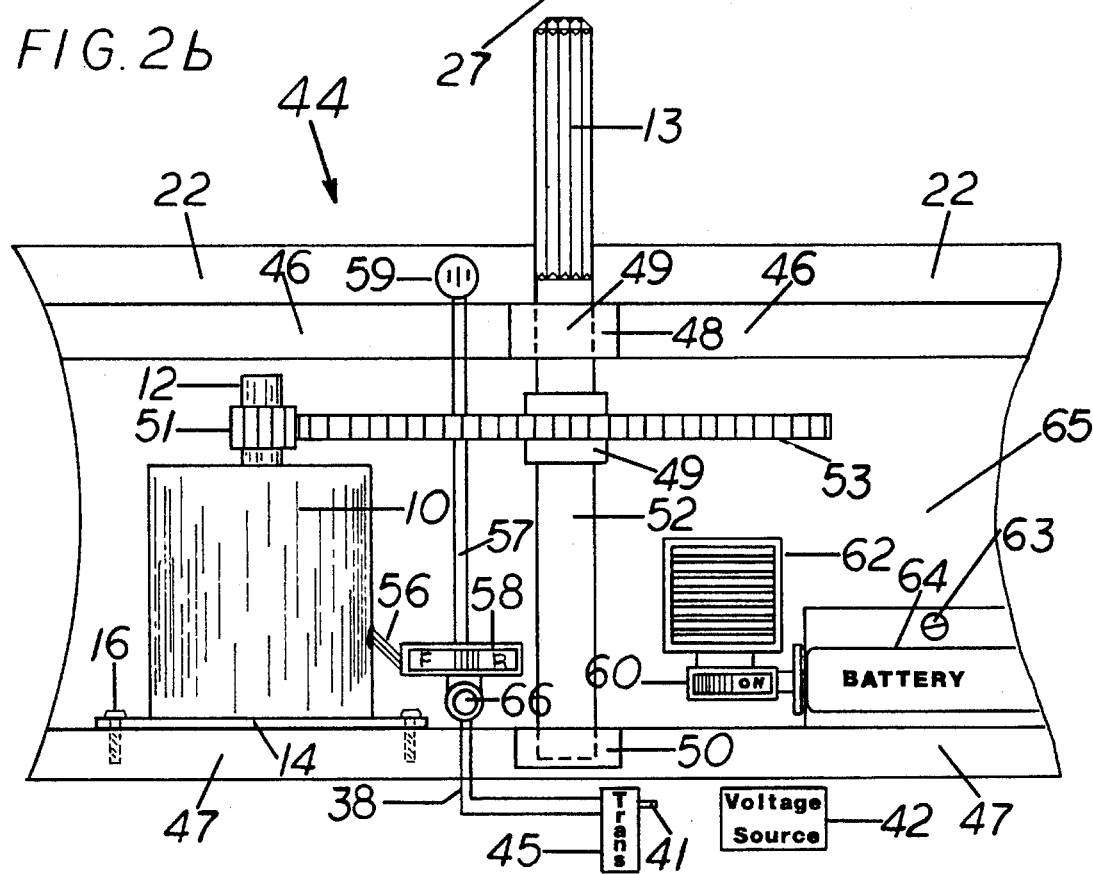
FIG. 2b shows a cutaway front plan view of a portion of the base enclosure as an alternate embodiment of FIG. 1a, using a transparent material for easier viewing of the mechanical components and accessory devices.

FIG. 2b shows an alternate embodiment of FIG. 1a in a cutaway plan front view of a portion of the base enclosure assembly 44, in a transparent material for easier viewing of the mechanical components and accessory devices within. The electric motor t0 is mounted rigid to base floor 47 by its integral mounting plate 14, with a plurality of screws 16.

The motor shaft 12 has a small gear 51 fastened to its shaft for turning the larger gear 53 attached to spline shaft 52 by its hub 49. The spline shaft 52 is held rigidly vertical by pressed in sleeve bearing 48, through the hole 49 in top of enclosure cover 46, and the bottom of spline shaft 52 is held rigid and supported by cup bearing 50 pressed into a recessed opening of base floor 47. The uppermost portion of the spline shaft 52, extending above the exterior of the enclosure assembly 44 is the spline 13 portion for coupling internally to the recessed opening 27 of the rubbing medium 29 of FIG. 2a. The debris retention rail 22 completely encircles the perimeter of the base floor surface 46. The electric motor 10 has a plurality of conducting wires 56 connected to an off, forward, and reverse switch 58. A power source receptacle 42 provides voltage to an integral transformer 45, and a male plug 41 for reducing line voltage to a smaller, harmless voltage, which in turn is connected by wires 38 to a speed controlling rheostat 66 for varying the rotational motion of the shaft spline 13 when required. A battery 64, accessable through an access cover screw 63, mounted to the vertical face 65 of the enclosure assembly 44, powers a prerecorded electronic audio device mounted integrally to the rear of grill 62. The audio portion can have prerecorded, intermittant sounds of a mouse, or a human talking to an animal, and the like, as an incentive for an animal to frequent the device more often. An on-off switch 60 is employed to conserve battery 64 power. A sensor 59 is employed to activate the motor 10 of the device by shunting or diverting wires 38 attached to switch 58, to wires 56 of the motor 10, if automatic use of the device is desired. Any common sensor device can be employed to activate the device, such as motion, heat, or optical.

The mechanisms can be modified by various methods for producing and performing a predetermined rate of rotational motion and torque to substantially meet the needs of the many sizes and classification of animals. For example, a belt shaped rubbing medium of predetermined length made to rotate from a motor shaft driver to a tensioning spindle to accomodate a conveyor type brushing medium belt. The rubbing medium belt surface can be mounted horizontally or vertically on a device base or affixed vertically by brackets to a wall structure surface. Such an application would serve the outdoor animal or an animal in a zoo habitat. Thus it has been shown that the mechanically assisted animal self grooming device can perform all of the objectives as outlined above.

While the specifications may contain many specific details, these should not be construed as limitations on the scope and synergism of the invention, but rather as examples of embodiments or modifications herein detailed in accordance with the descriptive requirements of law. It should be understood that the details are to be interpreted as illustrative and not in a limiting sense.

I claim:

1. A mechanically assisted animal self grooming device comprising:

a) a base having a generally flat horizontal upper surface; and;

b) rubbing means disposed centrally of said base on said upper horizontal surface, said rubbing means comprising:

i) a vertically oriented shaft extending upwardly of said base;

means for rotating said shaft disposed on said upper surface, said rotating means causing said shaft to rotate at a preselected rate of revolution; and iii) a brush having a rigid body directly coupled to said shaft and a plurality of bristles extending outwardly from said rigid body, said brush being disposed above said upper surface of said base; and c) a plurality of recesses in a portion of said upper surface of said base for containment of animal debris, said recesses being disposed centrally thereof about the periphery of said shaft rotating means.

2. The device of claim 1 wherein said base is circular in cross-section.

3. The device of claim 1, wherein said means for rotating said shaft comprises an electric motor assembly.

4. The device of claim 1, wherein said brush has a substantially upstanding concave shape to enable said and top surface grooming simultaneously to an animal's coat.

5. The device of claim 1, further comprising a reversing switch connected to said means for rotating said shaft such that the direction of rotation of said shaft may be selectively reversed.

6. The device of claim 1, wherein said upper surface includes means for permitting an animal to sink its claws therein disposed between said portion having said plurality of recesses therein and the periphery of said base so as to function as a scratching pad for an animal.

* * * * *